United States Patent
Smith, III et al.

(10) Patent No.: US 9,822,895 B2
(45) Date of Patent: Nov. 21, 2017

(54) METAL REINFORCED SEAL PLATE FOR PILOT ACTUATED SPOOL VALVE

(71) Applicant: Hunting Energy Services, Inc., Stafford, TX (US)

(72) Inventors: Robert E. Smith, III, Missouri City, TX (US); Frank Harold Hollister, Sugar Land, TX (US); Richard R. Watson, Missouri City, TX (US); Dane Tipton, Richmond, TX (US)

(73) Assignee: Hunting Energy Services, Inc., Stafford, TX (US)

( * ) Notice: Subject to any disclaimer, the term of this patent is extended or adjusted under 35 U.S.C. 154(b) by 0 days.

(21) Appl. No.: 15/606,708

(22) Filed: May 26, 2017

(65) Prior Publication Data

US 2017/0261112 A1    Sep. 14, 2017

Related U.S. Application Data (62) Division of application No. 14/958,359, filed on Dec. 3, 2015, which is a division of application No. 13/633,701, filed on Oct. 2, 2012, now abandoned.

(60) Provisional application No. 61/655,862, filed on Jun. 5, 2012.

(51) Int. Cl.
| | |
|---|---|
| *F16K 11/07* | (2006.01) |
| *F16K 25/00* | (2006.01) |
| *F16K 1/42* | (2006.01) |
| *F16K 11/044* | (2006.01) |

(52) U.S. Cl.
CPC .............. *F16K 25/005* (2013.01); *F16K 1/42* (2013.01); *F16K 11/044* (2013.01); *Y10T 137/8663* (2015.04)

(58) Field of Classification Search
CPC .......... F16K 25/005; F16K 1/42; F16K 11/04; Y10T 137/8663; Y10T 137/86702; Y10T 137/402
USPC ....... 277/644, 651, 628, 637, 641, 643, 905, 277/185, 192, 194, 226; 137/236.1, 137/625.6, 625.66, 625.68
See application file for complete search history.

(56) References Cited

U.S. PATENT DOCUMENTS

| | | | | |
|---|---|---|---|---|
| 494,402 | A * | 3/1893 | Walsh | F16J 15/106 251/357 |
| 1,544,219 | A * | 6/1925 | Collar | F16K 29/00 137/243.2 |
| 1,701,691 | A * | 2/1929 | Mueller | F16L 41/06 137/318 |
| 1,947,257 | A * | 2/1934 | Fritz | F16K 27/0272 137/375 |
| 3,191,905 | A * | 6/1965 | Brown | E21B 21/106 137/516.25 |
| 3,737,169 | A * | 6/1973 | Glynn | F16J 15/123 264/259 |

(Continued)

*Primary Examiner* — Craig J Price
(74) *Attorney, Agent, or Firm* — Blank Rome, LLP (57) ABSTRACT

Upper and/or lower seal plates of a sub plate mounted, pilot actuated spool valve are reinforced with one or more metal rings. In a number of preferred embodiments, the metal ring is comprised of steel. Portions of the seal plates may comprise an engineering thermoplastic such as polyoxymethylene (POM) sold by E. I. DuPont de Nemours under the DELRIN® trademark. The plastic material may be molded to the metal ring. In other embodiments, the plastic material and metal ring(s) are mechanically connected together.

12 Claims, 9 Drawing Sheets

(56) References Cited

U.S. PATENT DOCUMENTS

| | | | | |
|---|---|---|---|---|
| 4,163,544 A * | 8/1979 | Fowler | F16K 3/0227 | 251/315.08 |
| 4,457,489 A * | 7/1984 | Gilmore | F16L 37/28 | 137/596.18 |
| 4,553,736 A * | 11/1985 | Dellario | F16K 11/04 | 251/334 |
| 4,616,857 A * | 10/1986 | Woodman | E21B 17/085 | 277/322 |
| 4,795,174 A * | 1/1989 | Whitlow | F16J 15/122 | 277/654 |
| 4,828,274 A * | 5/1989 | Stannard | B65D 90/105 | 220/378 |
| 4,887,643 A * | 12/1989 | Tomlin | E21B 33/0355 | 137/236.1 |
| 5,096,029 A * | 3/1992 | Bauer | A47C 3/30 | 137/270 |
| 5,535,899 A * | 7/1996 | Carlson | A61J 11/04 | 215/11.1 |
| 5,564,715 A * | 10/1996 | Wallace | F16J 15/127 | 277/612 |
| 5,687,975 A * | 11/1997 | Inciong | F02F 7/006 | 277/591 |
| 5,771,931 A * | 6/1998 | Watson | E21B 33/0355 | 137/236.1 |
| 5,938,246 A * | 8/1999 | Wallace | F16L 23/18 | 277/314 |
| 6,406,029 B1 * | 6/2002 | Kupper | F16J 15/3456 | 277/383 |
| 6,422,268 B1 * | 7/2002 | Fleig | F16J 15/122 | 137/625.31 |
| 6,695,357 B2 * | 2/2004 | Schenk | F16J 15/003 | 277/602 |
| 6,783,161 B2 * | 8/2004 | Halama | F16L 37/008 | 285/308 |
| 6,932,354 B2 * | 8/2005 | Kane | F16J 15/061 | 251/333 |
| 7,311,311 B2 * | 12/2007 | Hosokawa | F16J 15/024 | 277/641 |
| 7,331,359 B2 * | 2/2008 | Shay | F16K 3/08 | 137/454.2 |
| 7,849,876 B2 * | 12/2010 | Jabcon, Jr. | F16K 11/044 | 137/625.38 |
| 7,854,434 B2 * | 12/2010 | Heiman | F16J 15/121 | 277/628 |
| 2005/0104301 A1 * | 5/2005 | Carter | F16K 31/0665 | 277/530 |
| 2005/0224119 A1 * | 10/2005 | Okamoto | F16J 15/104 | 137/625.69 |
| 2009/0256317 A1 * | 10/2009 | Mellander | B60K 15/03 | 277/642 |
| 2011/0079302 A1 * | 4/2011 | Hawes | F16K 25/005 | 137/538 |
| 2012/0193565 A1 * | 8/2012 | Rowe | F16K 11/0712 | 251/359 |
| 2013/0020521 A1 * | 1/2013 | Byrne | F16K 1/385 | 251/334 |

\* cited by examiner

METAL REINFORCED SEAL PLATE FOR PILOT ACTUATED SPOOL VALVE

CROSS-REFERENCE TO RELATED APPLICATIONS

This application is a divisional of U.S. application Ser. No. 14/958,359 filed on Dec. 3, 2015, which is a divisional of U.S. application Ser. No. 13/633,701 filed on Oct. 2, 2012, which claims the benefit of U.S. Provisional Application No. 61/655,862, filed on Jun. 5, 2012.

STATEMENT REGARDING FEDERALLY SPONSORED RESEARCH OR DEVELOPMENT

Not Applicable

BACKGROUND OF THE INVENTION

1. Field of the Invention

This invention relates to valves. More particularly, it relates to sub plate mounted, pilot actuated spool valves.

2. Description of the Related Art Including Information Disclosed under 37 CFR 1.97 and 1.98.

U.S. Pat. No. 5,771,931 to Watson discloses a reciprocating sleeve type valve mechanism having a valve housing within which is located a cage element. A piston, movably positioned within the valve housing, accomplishes linear opening movement of a cylindrical seal sleeve with respect to spaced polymer seals within the housing. Closing movement of the seal sleeve is accomplished by a return spring. Sealing between the cage element and a wear resistant external ceramic liner of the seal sleeve is accomplished by a seal assembly having a centrally located elastomer seal ring with polymer backup wiper rings positioned on opposite sides thereof. The seal assembly provides a bearing and guiding function to stabilize the seal sleeve during its opening and closing movement and to wipe particulate from the sealing surface of the seal sleeve as well as to maintain efficient sealing with the seal sleeve as the valve is opened and closed.

U.S. Pat. No. 4,887,643 to Tomlin et al. describes a housing that has a cage with supply fluid ports, vent ports and an outlet port. A pilot actuated hollow spool valve element is telescopically movable in the cage and engages poppet seats at opposite ends of the cage. Elongated supply and vent slots directed transversely to the axis of the cage and valve element provide maximum flow passages. The ends of the spool are in contact with the cage at all times and the axial extent of the contact between the spool and the cage is greater than fifty percent. The spool engages the interior of the cage at the fluid ports and vent ports for reducing flow restrictions. A recess coaxially positioned at each end of the cage receives one of the valve seats. The housing abuts the cage for properly loading the valve seats. A dash pot cushions the valve element. A pilot control stem is connected to the valve element exteriorly of the valve element. A seal carrier provides a seal between mating surfaces of an underwater control pod.

U.S. Pat. No. 4,457,489 to Gilmore describes subsea fluid conduit connections for remote controlled valves.

It has been found that the polymer seal plates in valves of this type tend to distort by bowing when subjected to higher pressures. The present invention solves this problem.

BRIEF SUMMARY OF THE INVENTION

Upper and/or lower seal plates of a sub plate mounted, pilot actuated spool valve are reinforced with a metal ring. In a number of preferred embodiments, the metal ring is comprised of steel. The seal plates may comprise an engineering thermoplastic such as polyoxymethylene (POM) sold by E. I. DuPont de Nemours under the DELRIN® trademark. The plastic material may be molded to the metal ring. In other embodiments, formed plastic material and a metal ring(s) are mechanically connected together.

DETAILED DESCRIPTION OF THE INVENTION

The invention may best be understood by reference to the exemplary embodiment(s) illustrated in the drawing figures and described, below.

Figure 1:
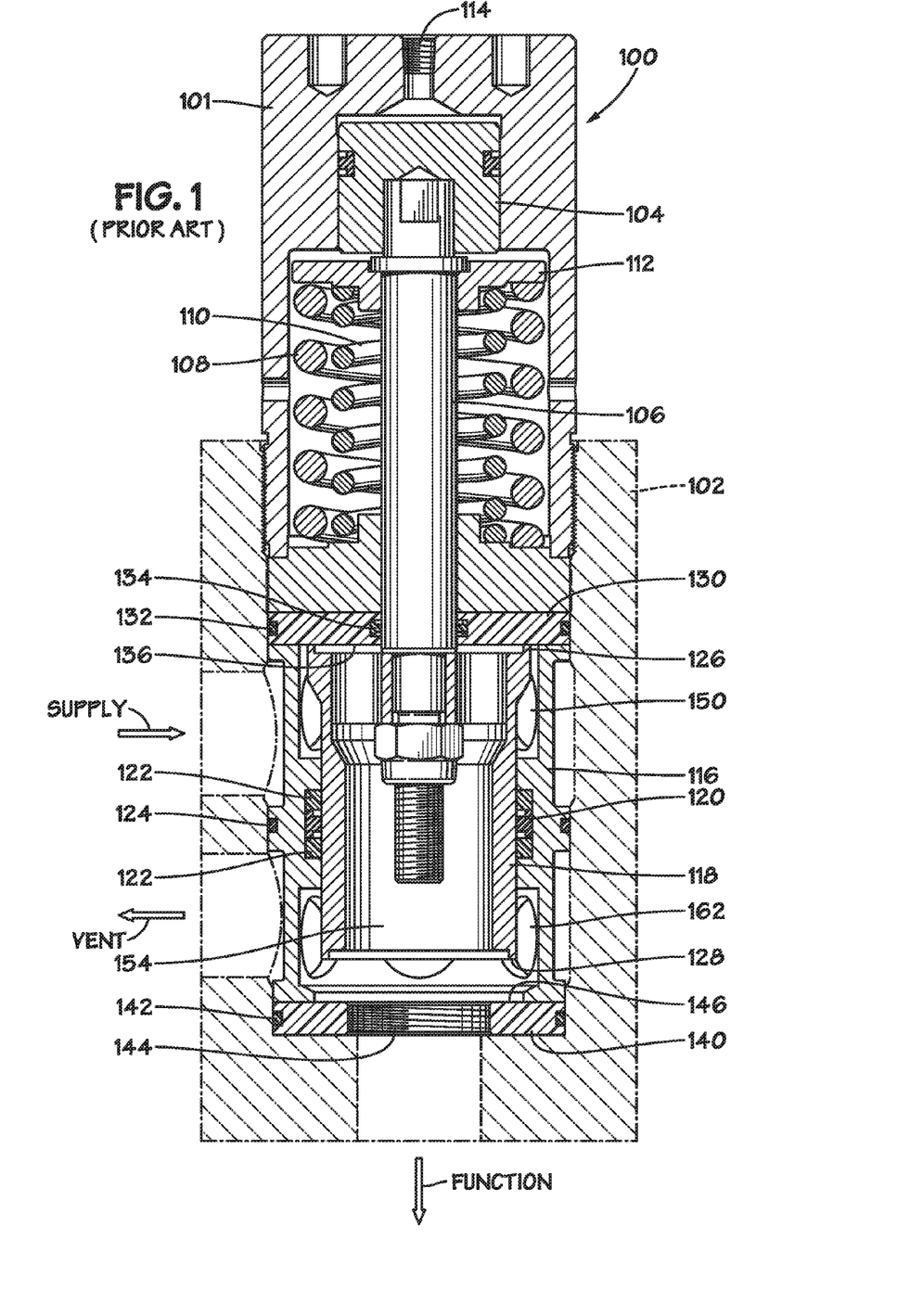
FIG. 1 is a cross-sectional view of a sub-plate mounted, normally-closed, spool valve of the prior art.

FIG. 1 depicts a reciprocating sleeve (or "spool") type valve mechanism 100 of the prior art. Upper section 101 screws into valve housing 102. In the case of sub-plate mounted ("SPM") valves, 102 may be a sub-plate.

The valve is actuated by piston 104 which is responsive to hydraulic pressure supplied via pilot pressure port 114. Outer spring 108 and concentric inner spring 110 acting against end plate 112 return piston 104 to the position shown in FIG. 1 when the pilot hydraulic pressure decreases to a certain level. Valve 100 is a normally-closed ("N.C.") valve—i.e., in the absence of hydraulic pressure at port 114, the valve, acting under the influence of springs 108 and 110, closes the supply port to the function port (and opens the function port to the vent port).

The lower portion of valve 100 comprises upper polymer seal 130, valve cage 116, lower polymer seal 140 and valve spool or seal sleeve 118. Spool 118 slides within the inner bore of cage 116 in response to the action of valve stem 106 which is connected to piston 104. T-seal 120 and wipers/back-up seals 122 provide a seal between the inner bore of valve cage 116 and the outer, cylindrical surface of spool 118. The outer surface of valve cage 116 has a circumferential groove for holding O-ring seal 124 for sealing to the walls of the bore in valve housing 102.

Valve spool 118 includes upper annular sealing surface 126 which bears against surface 136 of seal 130 when the valve is in the closed position and lower annular sealing surface 128 which bears against surface 146 of seal 140 when the valve is in the open position.

Upper disk seal 130 includes a perimeter groove for O-ring seal 132 and a groove in the wall of its central axial opening for shaft seal 134. Likewise lower seal 140 has a perimeter groove for retaining O-ring seal 142. In the illustrated valve, central axial opening 144 of seal disk 140 is internally threaded for engagement with an insertion/removal tool (not shown).

The illustrated seals plates may be used as the upper seal plate and, in certain embodiments, as the lower seal plate. Those skilled in the art will appreciate that embodiments intended for use as the lower seal plate need not have the groove on the inside diameter of the central axial opening for accommodating a seal. Instead, the central axial opening in the lower seal plate may be internally threaded to facilitate the insertion and removal of the seal plate from the bore by attachment to a matching, externally-threaded tool.

In operation, the function port is in fluid communication with the vent port via vent port openings 152 in valve cage 116 when valve 100 is in the closed position. In the closed condition, supply port fluid communication with central passageway 154 via supply flow port openings 150 in valve cage 116 (and hence the function port) is blocked by the sealing engagement of sealing surface 125 with seal 130. When valve 100 is in the open position, spool 118 moves downward (as oriented in FIG. 1) until sealing surface 128 engages seal 140. This action closes the fluid communication between the vent port and the function port and, because sealing surface 126 has consequently moved away from surface 136 of seal 130, fluid may flow from the supply port via openings 150 into central passage 154 of spool 118, through central opening 144 in seal 140 and out the function port.

It has been found, in practice, that the pressure of sealing surface 126 on polymer seal 130 and the pressure of sealing surface 128 on polymer seal 140 can, over time, cause those seals to deform. Most often, the deformation is manifest as a coning of the seal plate—i.e., the center portion of the seal plate is axially deflected towards the spool. Such deformation can compromise the sealing effectiveness of the valve.

Figure 2:
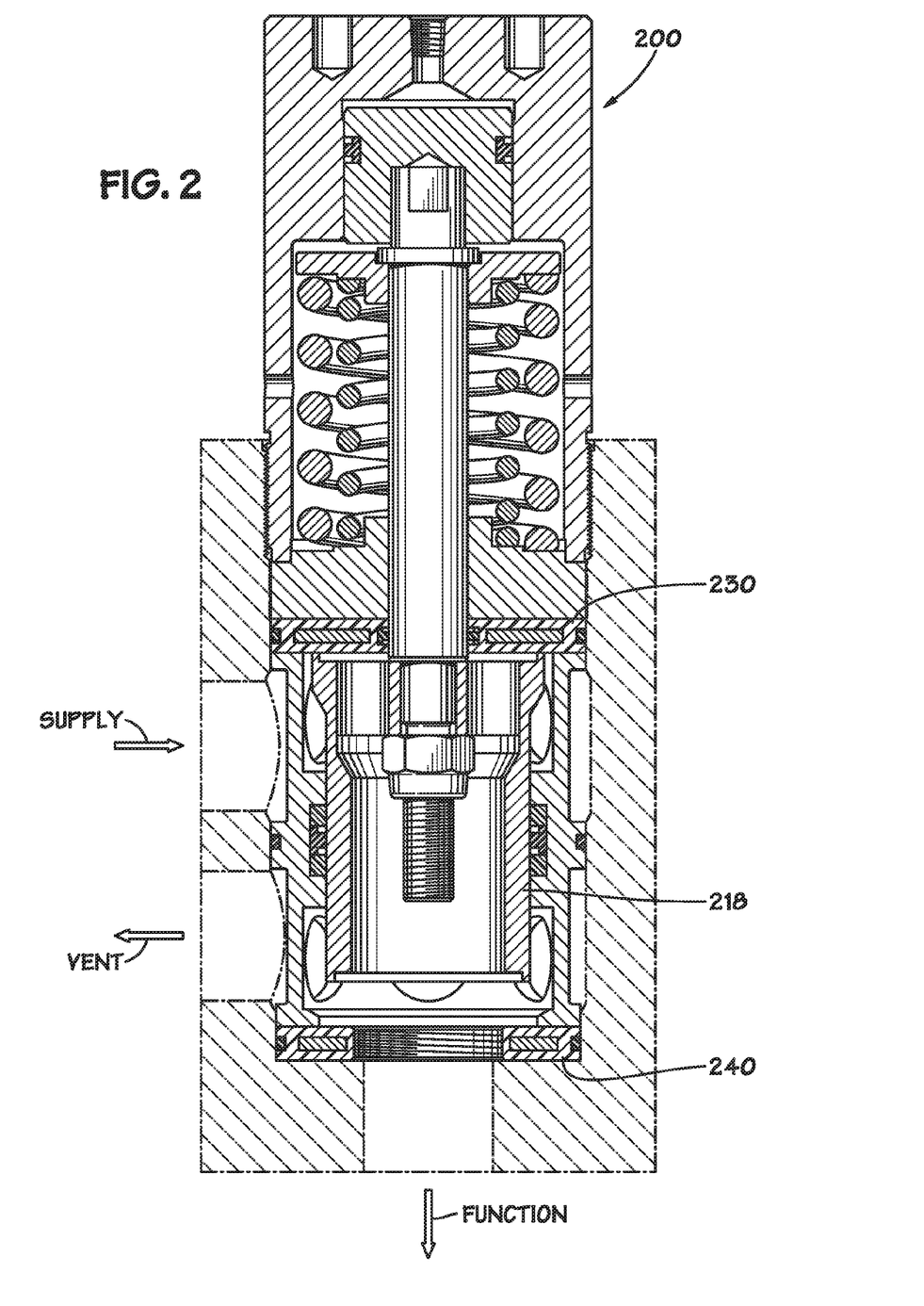
FIG. 2 is a cross-sectional view of a sub-plate mounted, normally-closed, spool valve equipped with upper and lower seal plates according to the invention.

FIG. 2 depicts a sub-plate mounted valve 200 equipped with improved seal disks according to one embodiment of the invention. More specifically, upper seal 230 is of the type illustrated in FIG. 4A and discussed infra and lower seal 240 is of the type depicted in FIG. 4B. In all other aspects, valve 200 is the same as valve 100 (illustrated in FIG. 1). The upper and lower ends of sliding spool 218 engage upper seal 230 and lower seal 240, respectively, as the spool moves in response to pilot hydraulic pressure. As will be appreciated by those skilled in the art, this means that many SPM valves of the prior art may be easily retrofitted with improved upper and lower seal disks according to the present invention.

Figure 3:
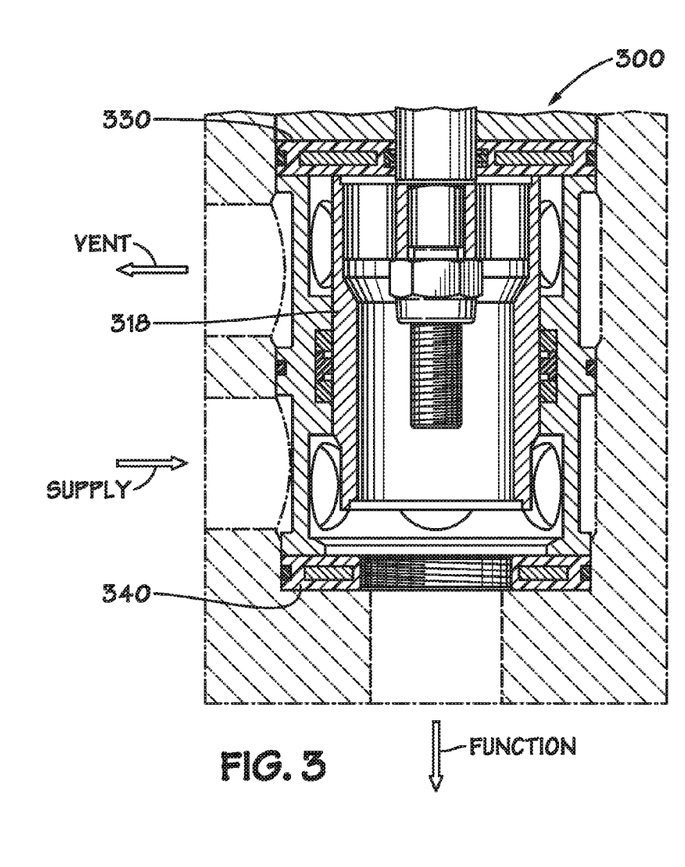
FIG. 3 is a cross-sectional view of a sub-plate mounted, normally-opened, spool valve equipped with upper and lower seal plates according to the invention.

FIG. 3 depicts a normally-open, sub-plate mounted valve 300 equipped with improved seal disks according to one embodiment of the invention. More specifically, upper seal 330 is of the type illustrated in FIG. 4A and discussed infra and lower seal 340 is of the type depicted in FIG. 4B. The upper and lower ends of sliding spool 318 engage upper seal 330 and lower seal 340, respectively, as the spool moves in response to pilot hydraulic pressure. Except for seal disks 330 and 340, valve 300 is a conventional, normally-open spool valve. As will be appreciated by those skilled in the art, this means that many SPM valves of the prior art may be easily retrofitted with improved upper and lower seal disks according to the present invention.

As indicated by the crosshatch patterns in the drawing figures, seal plates according to the invention comprise at least two materials of differing properties. The portion of the seal plate that contacts the sealing surface of the spool valve comprises a thermoplastic material. Other portions of the seal plate are fabricated from a harder and/or stiffer material such as a metal. One particular preferred metal is steel. This combination of materials provides a seal plate with enhanced dimensional stability and resistance to deformation while preserving the sealing effectiveness of the single-material seal plates of the prior art.

Portions of the seal plate may comprise DELRIN® polyoxymethylene or similar polymers. Polyoxymethylene (POM), also known as acetal, polyacetal and polyformaldehyde is an engineering thermoplastic used in precision parts that require high stiffness, low friction and excellent dimensional stability. Like many other synthetic polymers, it is produced by different chemical firms with slightly different formulas and is therefore sold under many commercial names such as DELRIN® (E. I. du Pont de Nemours and Company 1007 Market St. Wilmington Del.), CELCON® (Celanese Corporation of America 180 Madison Ave. New York N.Y.), HASTAFORM® (Hoechst Aktiengesellscfhaft Industriepark Höchst Frankfurt am Main Germany D65926) etc.

POM is characterized by its high strength, hardness and rigidity to ~40° C. POM has a density of $\rho=1.410$-$1.420$ g/cm$^3$ and is intrinsically opaque white, due to its highly crystalline composition. POM is a tough material with a very low coefficient of friction, high abrasion resistance, high heat resistance and low water absorption. It is dimensionally stable under exposure to moisture and heat; resistant to chemicals, solvents, flexing and creep; and has a high gloss and low friction surface.

A polyoxymethylene thermoplastic polymer may be obtained by the ionically-initiated polymerization of formaldehyde+$CH_2$ to obtain a linear molecule of the type —CH—CH=$CH_2$—. Single molecules may have over 1500 —$CH_2$— units. Because the molecule has no side chains, dense crystals are formed.

POM is commercially supplied in a granulated form and can be formed into the desired shape by applying heat and pressure. The two most common forming methods employed are injection molding and extrusion. Rotational molding and blow molding are also possible.

When supplied as extruded bar or sheet, POM may be machined using traditional methods such as turning, milling, drilling etc.

Other engineering plastics and thermoplastics may also be used to fabricate the seal plates of the present invention.

Figures 4A, 4B:
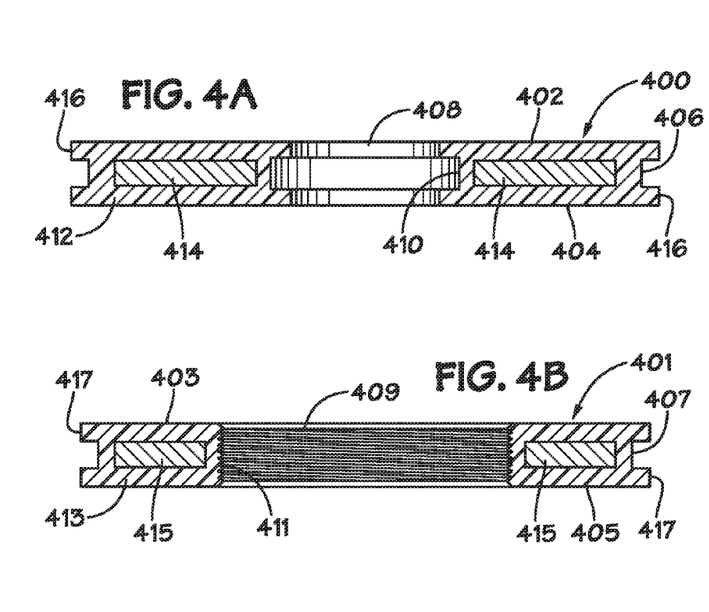
FIG. 4A is cross-sectional view of an upper seal plate for a spool valve according to a first embodiment of the invention
FIG. 4B is cross-sectional view of a lower seal plate for a spool valve according to a first embodiment of the invention.

Referring now to FIG. 4A, an upper seal plate 400 according to a first embodiment of the invention is shown. Seal plate 400 comprises thermoplastic body 412 in a generally ring-shaped configuration having upper, generally planar surface 402, an opposing, lower, generally planar surface 404 with a central, axial opening 408 providing a passage from upper surface 402 to lower surface 404. Perimeter surface 416 is generally cylindrical and may have circumferential groove 406 for retaining a seal which may be an O-ring seal for sealing between the seal plate 400 and the bore of the mounting plate in which the valve is inserted.

Central axial bore 408 may have undercut groove 410 in its inner wall for retaining a seal which may be a T-seal (such as is illustrated in FIGS. 1, 2 and 3) for sealing between upper seal plate 400 and valve stem 106.

Metal reinforcing ring 414 is molded within thermoplastic body 412 to provide additional strength to seal plate 400. In one particular preferred embodiment metal reinforcing ring 414 is steel and thermoplastic body 412 comprises [or is comprised of] DELRIN® polyoxymethylene. Seal plate 400 may be formed by injection molding or other molding methods known in the art. The mold cavity may be provided with means for properly locating reinforcing ring 414 within the cavity prior to and during injection of the thermoplastic material. Following cooling of body 412, surfaces 402, 404 and/or 416 may be smoothed and polished as necessary by machining and/or grinding as is well-known in the art. Seal grooves 406 and 410 may be molded into body 412 or subsequently machined into body 412. Metal reinforcing ring 414 may be machined, die stamped from sheet stock, cut from rod stock, molded from molten material or any other technique known in the art.

Referring now to FIG. 4B, a corresponding lower seal plate 401 according to a first embodiment of the invention is shown. Seal plate 401 comprises thermoplastic body 413 in a generally ring-shaped configuration having upper, generally planar surface 403, an opposing, lower, generally planar surface 405 with a central, axial opening 409 providing a passage from upper surface 403 to lower surface 405. Perimeter surface 417 is generally cylindrical and may have circumferential groove 407 for retaining a seal which may be an O-ring seal for sealing between the seal plate 401 and the bore of the mounting plate in which the valve is inserted.

Central axial bore 409 may have internal threads 411 for engaging an insertion and removal tool (not shown) having a corresponding, externally-threaded shaft.

Metal reinforcing ring 415 is molded within thermoplastic body 413 to provide additional strength to seal plate 401. In one particular preferred embodiment metal reinforcing ring 415 is steel and thermoplastic body 413 comprises [or is comprised of] Delrin® polyoxymethylene. Seal plate 401 may be formed by injection molding or other molding methods known in the art. The mold cavity may be provided with means for properly locating reinforcing ring 415 within the cavity prior to and during injection of the thermoplastic material. Following cooling of body 413, surfaces 403, 404 and/or 417 may be smoothed and polished as necessary by machining and/or grinding as is well-known in the art. Seal groove 407 and threads 411 may be molded into body 413 or subsequently machined or cut into body 413. Metal reinforcing ring 415 may be machined, die stamped from sheet stock, cut from rod stock, molded from molten material or any other technique known in the art.

Referring now to FIG. 5, upper and lower seal plates according to a second embodiment of the invention are shown. An upper metal seal plate with a thermoplastic insert is shown in FIG. 5A. The seal plate without the thermoplastic insert is shown in FIG. 5B. Seal plate 500 comprises metal body 520 in a generally ring-shaped configuration having upper, generally planar surface 502, an opposing, lower, generally planar surface 504 with a central, axial opening 508 providing a passage from upper surface 502 to lower surface 504. Perimeter surface 516 is generally cylindrical and may have circumferential groove 506 for retaining a seal which may be an O-ring seal for sealing between the seal plate 500 and the bore of the mounting plate in which the valve is inserted.

Central axial bore 508 may have undercut groove 510 in its inner wall for retaining a seal which may be a T-seal (such as is illustrated in FIGS. 1, 2 and 3) for sealing between upper seal plate 500 and valve stem 106.

Figure 5A:
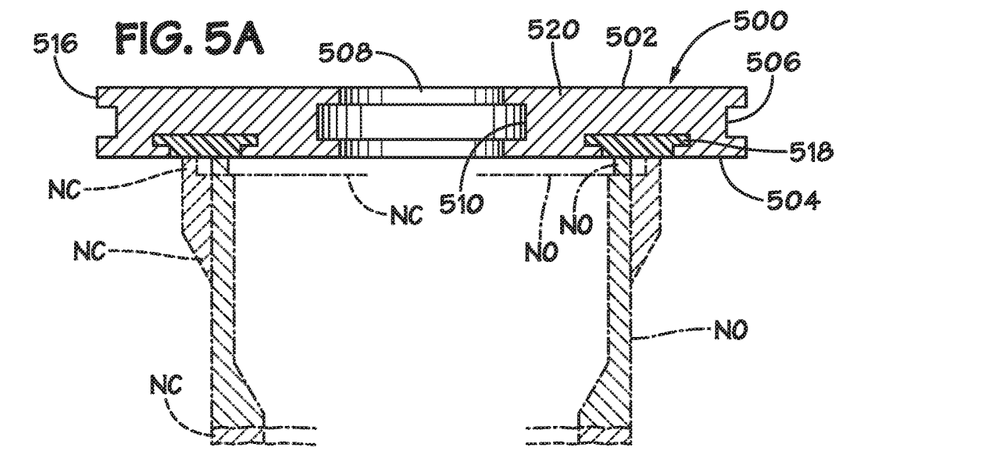
FIG. 5A is a cross-sectional view of an upper seal plate according to a second embodiment of the invention.
Figure 5B:
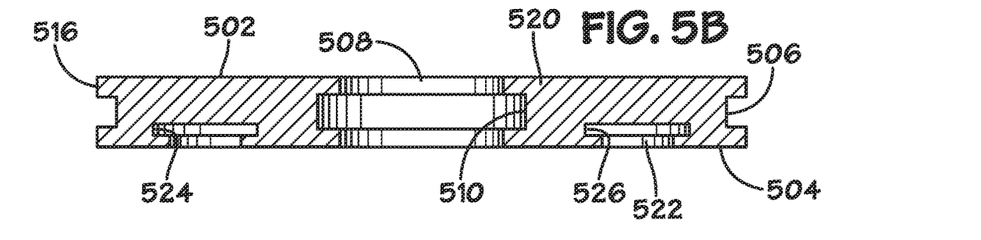
FIG. 5B shows the seal plate of FIG. 5A prior to installation of the annular, thermoplastic seal.

Metal seal plate 500 comprises annular cavity 522 having a generally T-shaped cross section (see FIG. 5B) which comprises outboard undercut groove 524 and inboard undercut groove 526. In one particular preferred embodiment metal body 520 is steel and thermoplastic insert 518 comprises [or is comprised of] DELRIN® polyoxymethylene. Metal body 520 may be formed by machining a metal blank or by other methods known in the art. Annular cavity 522 may act as a mold cavity for injection molding of thermoplastic insert 518. Alternatively, a generally ring-shaped blank of thermoplastic material having inner and outer diameters corresponding approximately to those of annular cavity 522 may be heated to a temperature below the melting point of the material and then pressed into cavity 522. It will be appreciated by those skilled in the art that the thermoplastic material will at least partially flow into undercut grooves 524 and 526 thereby anchoring insert 518 in cavity 522. Following cooling of insert 518, the exposed surface of insert 518 (at lower surface 504) may be smoothed and/or polished as necessary by machining and/or grinding as is well-known in the art.

As shown in phantom in FIG. 5A, annular cavity 522 is positioned within metal body 520 such that thermoplastic insert 518 is located within the contact area of the spool seal. Seal contacting surfaces for both normally-closed (NC) and normally-open (NO) spool valves are shown. Similar phantom depictions of spool contact surfaces are shown in FIGS. 6A, 7A, 8A, 9A, 10A and 11A.

Figure 5C:
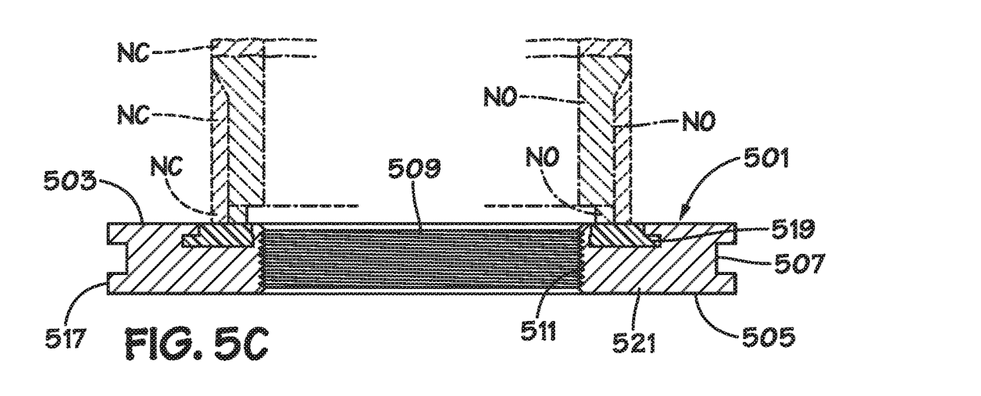
FIG. 5C is a cross-sectional view of a lower seal plate according to a second embodiment of the invention.
Figure 5D:
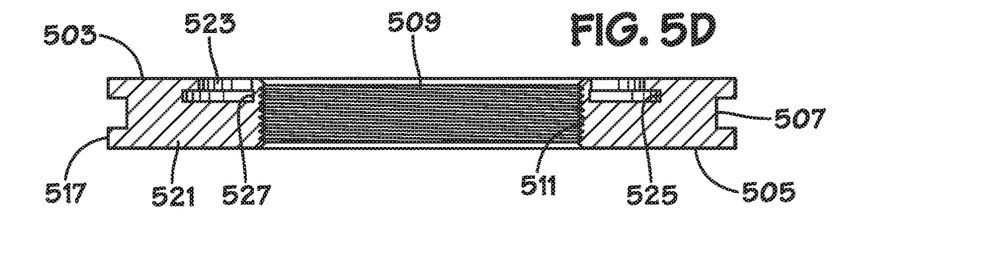
FIG. 5D shows the seal plate of FIG. 5C prior to installation of the annular, thermoplastic seal.

Referring now to FIGS. 5C and 5D, a corresponding lower seal plate 501 according to a second embodiment of the invention is shown. A lower metal seal plate with a thermoplastic insert is shown in FIG. 5C. The seal plate without the thermoplastic insert is shown in FIG. 5D. Seal plate 501 comprises metal body 521 in a generally ring-shaped configuration having upper, generally planar surface 503, an opposing, lower, generally planar surface 505 with a central, axial opening 509 providing a passage from upper surface 503 to lower surface 505. Perimeter surface 517 is generally cylindrical and may have circumferential groove 507 for retaining a seal which may be an O-ring seal for sealing between the seal plate 501 and the bore of the mounting plate in which the valve is inserted.

Central axial bore 509 may have internal threads 511 for engaging an insertion and removal tool (not shown) having a corresponding, externally-threaded shaft.

Metal seal plate 501 comprises annular cavity 523 having a generally L-shaped cross section (see FIG. 5D which comprises outboard undercut groove 525 and inboard undercut groove 527. In one particular preferred embodiment metal body 521 is steel and thermoplastic insert 519 comprises [or is comprised of] Delrin® polyoxymethylene. Metal body 521 may be formed by machining a metal blank or by other methods known in the art. Annular cavity 523 may act as a mold cavity for injection molding of thermoplastic insert 519. Alternatively, a generally ring-shaped blank of thermoplastic material having inner and outer diameters corresponding approximately to those of annular cavity 523 may be heated to a temperature below the melting point of the material and then pressed into cavity 523. It will be appreciated by those skilled in the art that the thermoplastic material will at least partially flow into undercut grooves 525 and 527 thereby anchoring insert 519 in cavity 523. Following cooling of insert 519, the exposed surface of insert 519 (at lower surface 505) may be smoothed and/or polished as necessary by machining and/or grinding as is well-known in the art.

As shown in phantom in FIG. 5C annular cavity 523 is positioned within metal body 521 such that thermoplastic insert 519 is located within the contact area of the spool seal. Seal contacting surfaces for both normally-closed (NC) and normally-open (NO) spool valves are shown.

Figure 6A:
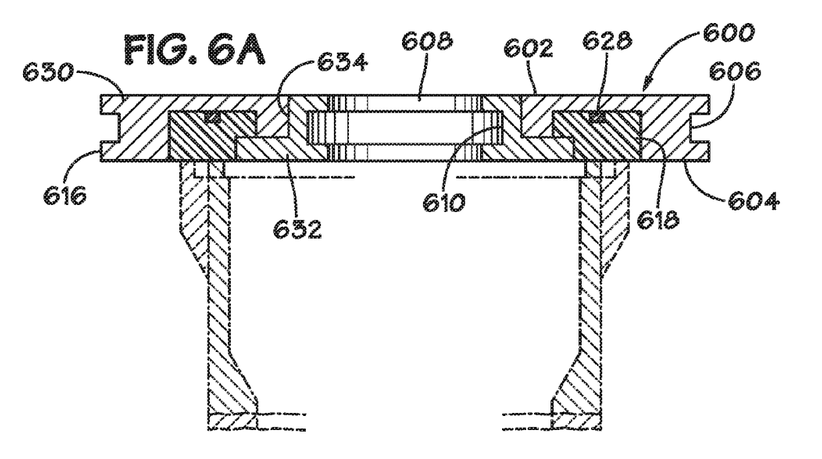
FIG. 6A is a cross-sectional view of an upper seal plate according to a third embodiment of the invention.
Figure 6B:
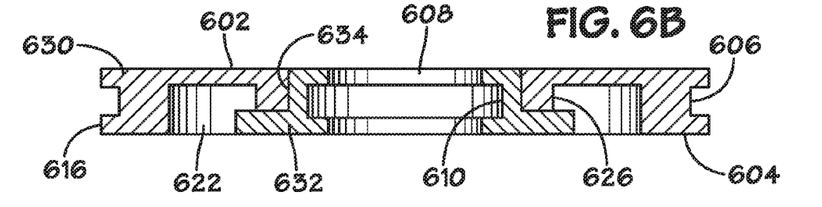
FIG. 6B shows the seal plate of FIG. 6A prior to installation of the annular, thermoplastic seal.

Referring now to FIGS. 6A and 6B, an upper seal plate according to a third embodiment of the invention is shown. An upper metal seal plate with a thermoplastic insert is shown in FIG. 6A. The seal plate without the thermoplastic insert is shown in FIG. 6B. Seal plate 600 comprises metal body portions 630 and 632 press-fitted together in a generally ring-shaped configuration having upper, generally planar surface 602, an opposing, lower, generally planar surface 604 with a central, axial opening 608 providing a passage from upper surface 602 to lower surface 604. Perimeter surface 616 is generally cylindrical and may have circumferential groove 606 for retaining a seal which may be an O-ring seal for sealing between the seal plate 600 and the bore of the mounting plate in which the valve is inserted.

Central axial bore 608 may have undercut groove 610 in its inner wall for retaining a seal which may be a T-seal (such as is illustrated in FIGS. 1, 2 and 3) for sealing between upper seal plate 600 and valve stem 106 (as illustrated in FIGS. 1, 2 and 3).

When assembled (as shown in FIG. 6B) metal seal plate 600 comprises annular cavity 622 having a generally L-shaped cross section which comprises inboard groove 626. In one particular preferred embodiment, metal body portions 630 and 632 are steel and thermoplastic insert 618 comprises [or is comprised of] DELRIN® polyoxymethylene. Metal body portions 630 and 632 may be formed by machining a metal blank or by other methods known in the art. An interference fit is provided at junction 634. It will be appreciated by those skilled in the art that the portion of thermoplastic insert 618 that extends into groove 626 acts to anchor insert 618 in cavity 622. The exposed surface of insert 618 (at lower surface 604) may be smoothed and/or polished as necessary by machining and/or grinding as is well-known in the art to make its surface flush with lower surface 604 of metal body portions 630 and 632.

Thermoplastic insert 618 may be machined, molded or formed by other methods known in the art. The upper surface of insert 618 may be provided with an annular groove for retaining seal 628 which may be an O-ring seal.

As shown in phantom in FIG. 6A, annular cavity 622 is positioned between metal body portions 630 and 632 such that thermoplastic insert 618 is located within the contact area of the spool seal.

Figure 7A:
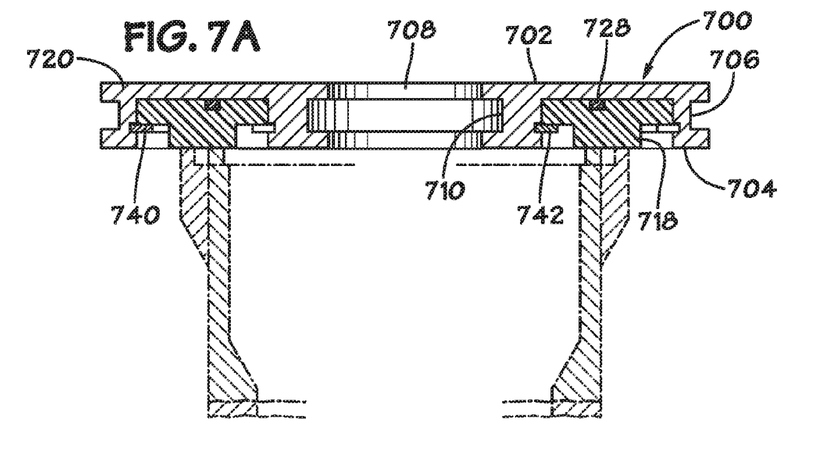
FIG. 7A is a cross-sectional view of an upper seal plate according to a fourth embodiment of the invention.
Figure 7B:
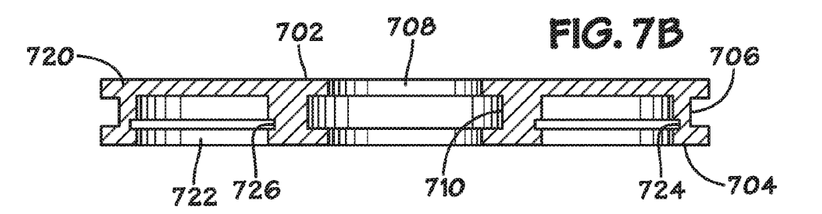
FIG. 7B shows the seal plate of FIG. 7A prior to installation of the annular, thermoplastic seal.

Referring now to FIGS. 7A and 7B, an upper seal plate according to a fourth embodiment of the invention is shown. An upper metal seal plate with a thermoplastic insert is shown in FIG. 7A. The seal plate without the thermoplastic insert is shown in FIG. 7B. Seal plate 700 comprises metal body 720 having a generally ring-shaped configuration with upper, generally planar surface 702, opposing, lower, generally planar surface 704 with central, axial opening 708 providing a passage from upper surface 702 to lower surface 704. Perimeter surface 716 is generally cylindrical and may have circumferential groove 706 for retaining a seal which may be an O-ring seal for sealing between the seal plate 700 and the bore of the mounting plate in which the valve is inserted.

Central axial bore 708 may have undercut groove 710 in its inner wall for retaining a seal which may be a T-seal (such as is illustrated in FIGS. 1, 2 and 3) for sealing between upper seal plate 700 and valve stem 106 (as illustrated in FIGS. 1, 2 and 3).

As shown in FIG. 7B, metal seal plate 700 comprises annular cavity 722 open to surface 704. The outer and inner walls of annular cavity 722 have grooves 724 and 726, respectively, sized to accommodate retainer clips 740 and 742. When installed, retainers 740 and 742 provide shoulders within annular cavity 722 that hold thermoplastic insert in cavity 722. In the illustrated embodiment, retainer 740 is an internal Circlip™ and retainer 742 is an external Circlip.

In one particular preferred embodiment, metal body 720 is steel and thermoplastic insert 718 comprises [or is comprised of] Delrin® polyoxymethylene. Metal body 720 may be formed by machining a metal blank or by other methods known in the art. The exposed surface of insert 718 (at lower surface 704) may be smoothed and/or polished as necessary by machining and/or grinding as is well-known in the art to make its surface flush with lower surface 704 of metal body 720.

Thermoplastic insert 718 may be machined, molded or formed by other methods known in the art. The upper surface of insert 718 may be provided with an annular groove for retaining seal 728 which may be an O-ring seal.

As shown in phantom in FIG. 7A, annular cavity 722 is positioned in metal body 720 such that thermoplastic insert 718 is located within the contact area of the spool seal.

Figure 8A:
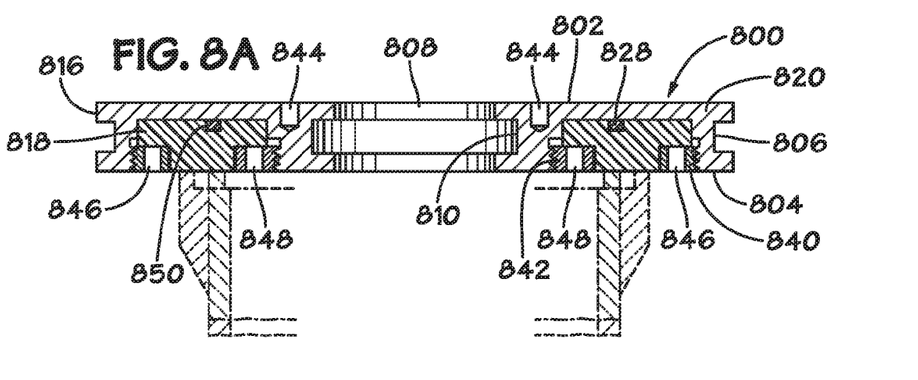
FIG. 8A is a cross-sectional view of an upper seal plate according to a fifth embodiment of the invention.
Figure 8B:
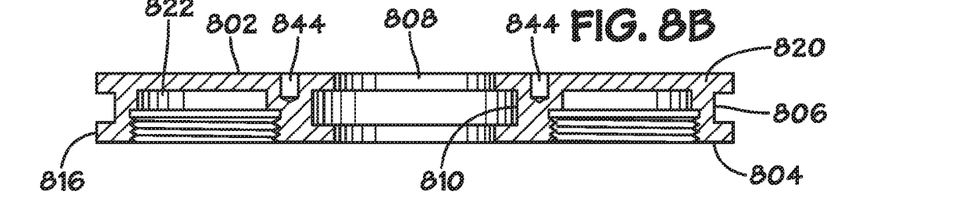
FIG. 8B shows the seal plate of FIG. 8A prior to installation of the annular, thermoplastic seal.
Figure 8C:
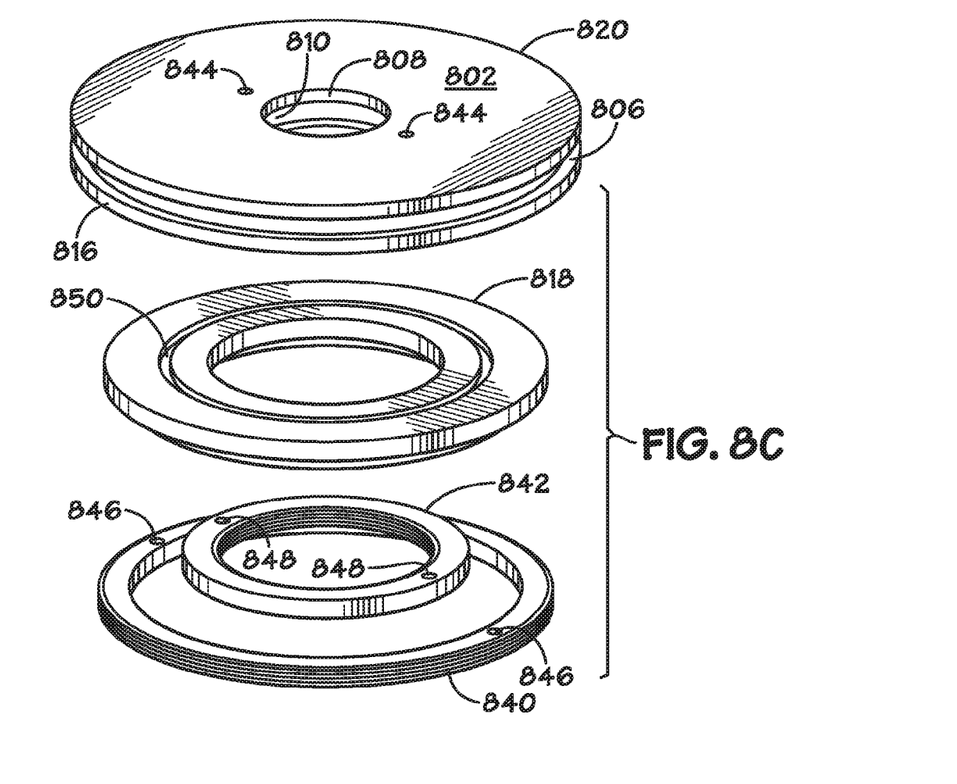
FIG. 8C is an exploded view of the seal plate of FIG. 8A.

Referring now to FIGS. 8A, 8B and 8C, an upper seal plate according to a fifth embodiment of the invention is shown. An upper metal seal plate with a thermoplastic insert is shown in FIG. 8A. The seal plate without the thermoplastic insert is shown in FIG. 8B. An exploded view of seal plate 800 is shown in FIG. 8C. Seal plate 800 comprises metal body 820 having a generally ring-shaped configuration with upper, generally planar surface 802, opposing, lower, generally planar surface 804 with central, axial opening 808 providing a passage from upper surface 802 to lower surface 804. Perimeter surface 816 is generally cylindrical and may have circumferential groove 806 for retaining a seal which may be an O-ring seal for sealing between the seal plate 800 and the bore of the mounting plate in which the valve is inserted.

Central axial bore 808 may have undercut groove 810 in its inner wall for retaining a seal which may be a T-seal (such as is illustrated in FIGS. 1, 2 and 3) for sealing between upper seal plate 800 and valve stem 106 (as illustrated in FIGS. 1, 2 and 3).

As shown in FIG. 8B, metal seal plate 800 comprises annular cavity 822 open to surface 804. The outer and inner walls of annular cavity 822 are threaded in the portion proximate surface 804. Thermoplastic insert 818 is retained in annular cavity 822 by outer retainer ring 840 and inner retainer ring 842. Retainer ring 840 is externally threaded to engage the threads on the outer wall of cavity 822 and retainer ring 842 is internally threaded to engage the threads on the inner wall of cavity 822. Spanner holes 844 in upper surface 802 of metal body 820 and spanner holes 846 and 848 in retainer rings 840 and 842, respectively, may be provided to facilitate the assembly of seal plate 800.

In one particular preferred embodiment, metal body 820 is steel and thermoplastic insert 818 comprises [or is comprised of] DELRIN® polyoxymethylene. Metal body 820 may be formed by machining a metal blank or by other methods known in the art. The exposed surface of insert 818 (at lower surface 804) may be smoothed and/or polished as necessary by machining and/or grinding as is well-known in the art to make its surface flush with lower surface 804 of metal body 820.

Thermoplastic insert 818 may be machined, molded or formed by other methods known in the art. The upper surface of insert 818 may be provided with annular groove 850 for retaining seal 828 which may be an O-ring seal.

As shown in phantom in FIG. 8A, annular cavity 822 is positioned in metal body 820 such that thermoplastic insert 818 is located within the contact area of the spool seal.

Figure 9A:
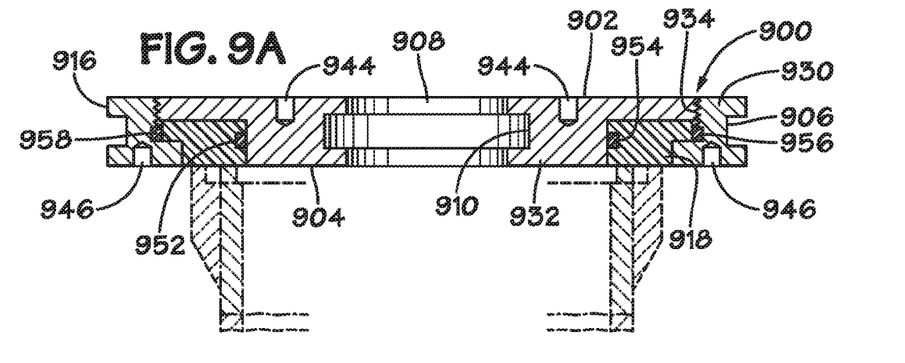
FIG. 9A is a cross-sectional view of an upper seal plate according to a sixth embodiment of the invention.
Figure 9B:
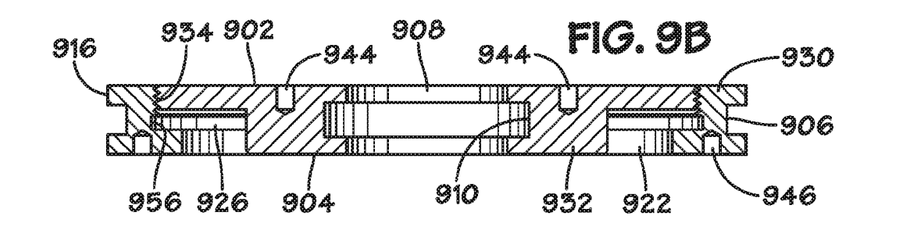
FIG. 9B shows the seal plate of FIG. 9A prior to installation of the annular, thermoplastic seal.
Figure 9C:
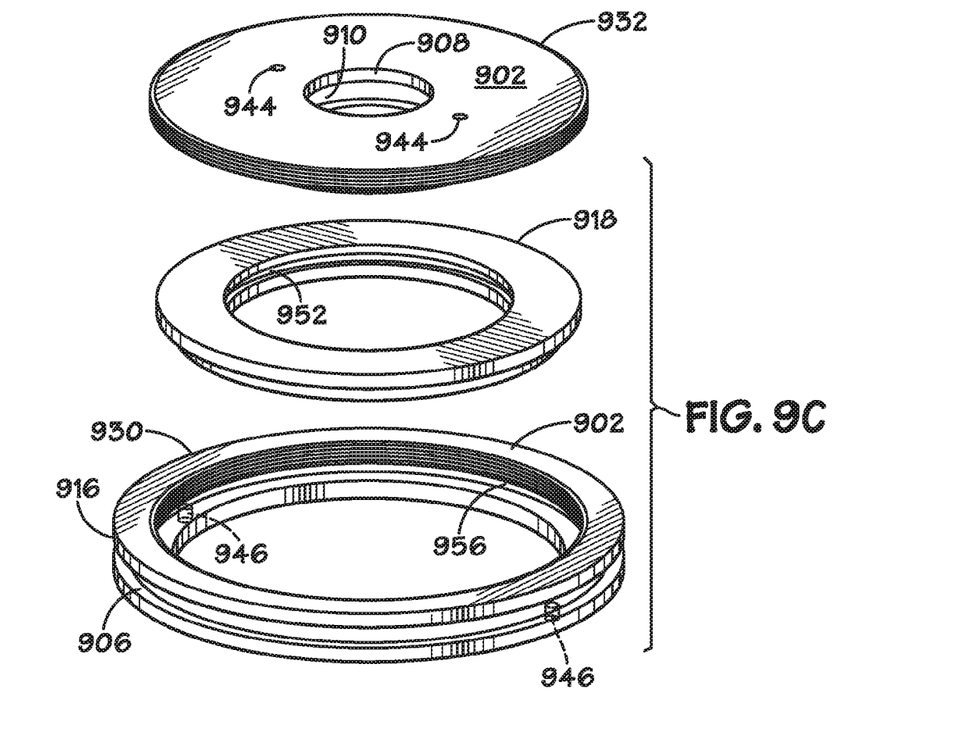
FIG. 9C is an exploded view of the seal plate of FIG. 9A.

Referring now to FIGS. 9A, 9B and 9C, an upper seal plate according to a sixth embodiment of the invention is shown. An upper metal seal plate with a thermoplastic insert is shown in FIG. 9A. The assembled seal plate without the thermoplastic insert is shown in FIG. 9B. An exploded view of upper seal plate 900 is shown in FIG. 9C.

Seal plate 900 comprises metal body portions 930 and 932 which screw together to produce a generally ring-shaped seal plate having upper, generally planar surface 902, an opposing, lower, generally planar surface 904 with a central, axial opening 908 providing a passage from upper surface 902 to lower surface 904. Perimeter surface 916 is generally cylindrical and may have circumferential groove 906 for retaining a seal which may be an O-ring seal for sealing between the seal plate 900 and the bore of the mounting plate in which the valve is inserted.

Central axial bore 908 may have undercut groove 910 in its inner wall for retaining a seal which may be a T-seal (such as is illustrated in FIGS. 1, 2 and 3) for sealing between upper seal plate 900 and valve stem 106 (as illustrated in FIGS. 1, 2 and 3).

Body portion 932 is generally disk-shaped and externally threaded. Body portion 930 is generally ring-shaped and internally threaded. Spanner holes 944 in body portion 932 and spanner holes 946 in body portion 930 may be provided to accommodate a tool (not shown) for assembling and disassembling upper seal plate 900.

When assembled (as shown in FIG. 9B) metal body portions 930 and 932 form annular cavity 922 having a generally L-shaped cross section which comprises outboard groove 926. In one particular preferred embodiment, metal body portions 930 and 932 are steel and thermoplastic insert 918 comprises [or is comprised of] Delrin® polyoxymethylene. Metal body portions 930 and 932 may be formed by machining metal blanks or by other methods known in the art. A threaded connection is provided at junction 934. It will be appreciated by those skilled in the art that the portion of thermoplastic insert 918 that extends into groove 926 acts to anchor insert 918 in cavity 922. The exposed surface of insert 918 (at lower surface 904) may be smoothed and/or polished as necessary by machining and/or grinding as is well-known in the art to make its surface flush with lower surface 904 of metal body portions 930 and 932.

Thermoplastic insert 918 may be machined, molded or formed by other methods known in the art. The inner surface of insert 918 may be provided with annular groove 952 for retaining seal 954 which may be an O-ring seal. Inner perimeter groove 956 may be provided below the threaded portion of body section 930 for retaining seal 958 which may be an O-ring seal. Seals 954 and 958 may provide a fluid-tight seal between thermoplastic insert 918 and metal body portions 930 and 932, respectively.

As shown in phantom in FIG. 9A, annular cavity 922 is positioned between metal body portions 930 and 932 such that thermoplastic insert 918 is located within the contact area of the spool seal.

Figure 10A:
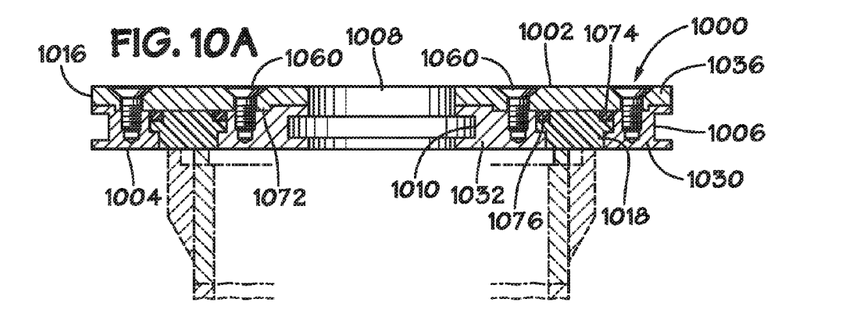
FIG. 10A is a cross-sectional view of an upper seal plate according to a seventh embodiment of the invention.
Figure 10B:
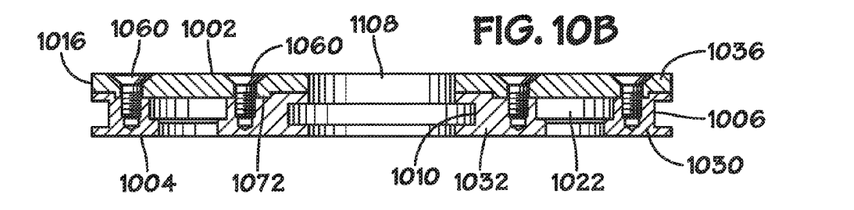
FIG. 10B shows the seal plate of FIG. 10A prior to installation of the annular, thermoplastic seal.
Figure 10C:
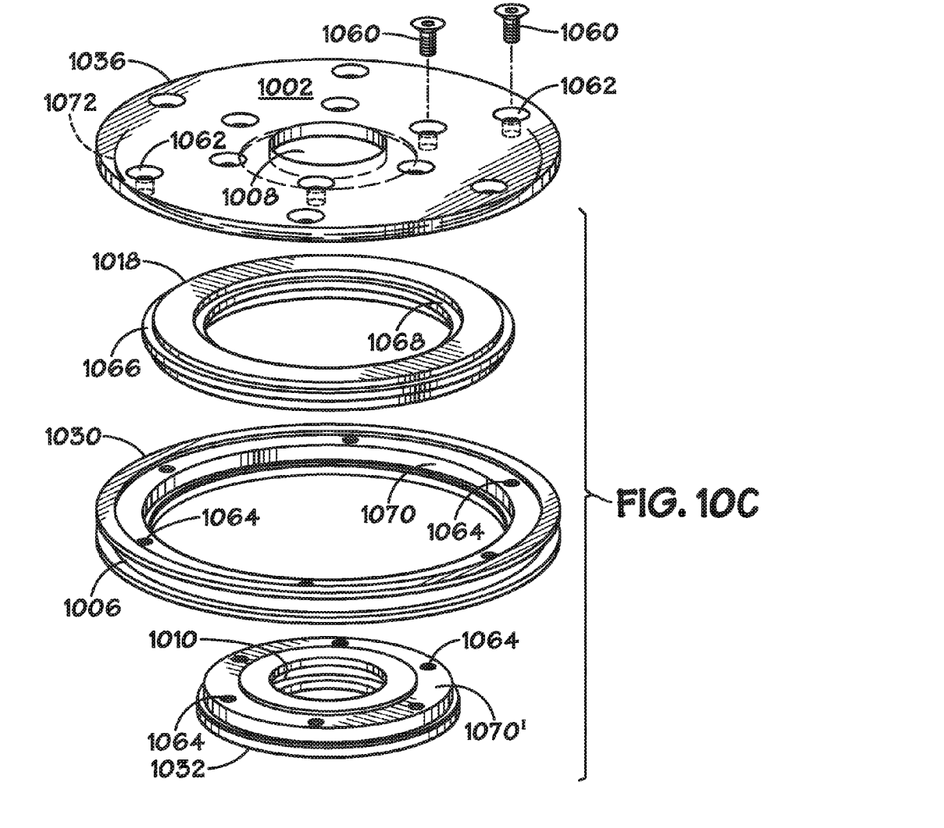
FIG. 10C is an exploded view of the seal plate of FIG. 10A.

Referring now to FIGS. 10A, 10B and 10C, an upper seal plate according to a seventh embodiment of the invention is shown. An upper metal seal plate with a thermoplastic insert is shown in FIG. 10A. The assembled seal plate without the thermoplastic insert is shown in FIG. 10B. An exploded view of upper seal plate 1000 is shown in FIG. 10C.

Seal plate 1000 comprises metal body portions 1030, 1032 and 1036 which are held together by machine screws 1060 to produce a generally ring-shaped seal plate having upper, generally planar surface 1002, an opposing, lower, generally planar surface 1004 with a central, axial opening 1008 providing a passage from upper surface 1002 to lower surface 1004. Perimeter surface 1016 is generally cylindrical and may have circumferential groove 1006 for retaining a seal which may be an O-ring seal for sealing between the seal plate 1000 and the bore of the mounting plate in which the valve is inserted.

Central axial bore 1008 may have undercut groove 1010 in its inner wall for retaining a seal which may be a T-seal (such as is illustrated in FIGS. 1, 2 and 3) for sealing between upper seal plate 1000 and valve stem 106 (as illustrated in FIGS. 1, 2 and 3).

Body portion 1036 is generally disk-shaped and has annular projection 1072 on its undersurface. Countersunk holes 1062 are sized and spaced for receiving screws 1060 and pass from the upper surface of disk 1036 to the underside thereof. Body portions 1030 and 1032 are generally ring-shaped and have a plurality of threaded bores 1064 sized and spaced to receive and engage machine screws 1060.

Body portion 1030 has inner shoulder 1070 and body portion 1032 has outer shoulder 1070'. When assembled, shoulders 1070 and 1070' together form a rabbet into which annular projection 1072 on the underside of disk 1036 may fit. This rabbet joint may produce more precise alignment of the body portions 1030, 1032 and 1036 than that provided by screws 1060, alone.

When assembled (as shown in FIG. 10B) metal body portions 1030, 1032 and 1036 form annular cavity 1022 having a generally T-shaped cross section. In one particular preferred embodiment, metal body portions 1030, 1032 and 1036 are steel and thermoplastic insert 1018 comprises [or is comprised of] DELRIN® polyoxymethylene. Metal body portions 1030, 1032 and 1036 may be formed by machining metal blanks or by other methods known in the art. The exposed surface of insert 1018 (at lower surface 1004) may be smoothed and/or polished as necessary by machining and/or grinding as is well-known in the art to make its surface flush with lower surface 1004 of metal body portions 1030, 1032 and 1036.

Thermoplastic insert 1018 may be machined, molded or formed by other methods known in the art. The outer, perimeter surface of insert 1018 may be provided with shoulder 1066 for retaining seal 1074 which may be an O-ring seal. The inner surface of generally ring-shaped thermoplastic insert 1018 may comprises shoulder 1068 for retaining seal 1076 which may be an O-ring seal. Seals 1074 and 1076 may provide a fluid-tight seal between thermoplastic insert 1018 and metal body portions 1030, 1032 and 1036.

As shown in phantom in FIG. 10A, annular cavity 1022 is positioned between metal body portions 1030, 1032 and 1036 such that thermoplastic insert 1018 is located within the contact area of the spool seal.

Figure 11A:
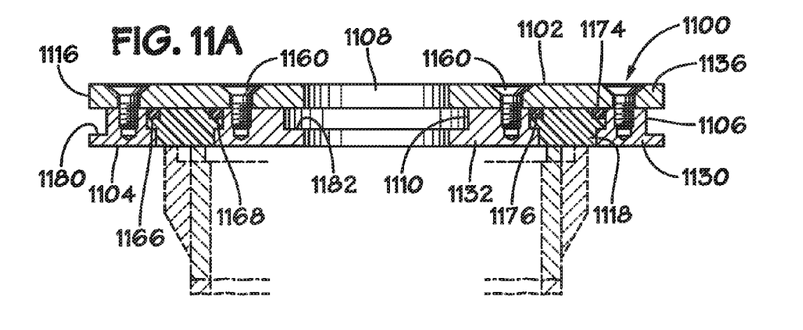
FIG. 11A is a cross-sectional view of an upper seal plate according to a fifth embodiment of the invention.
Figure 11B:
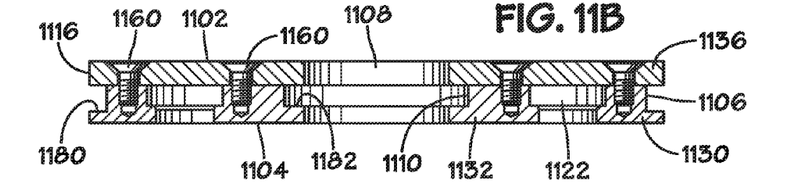
FIG. 11B shows the seal plate of FIG. 11A prior to installation of the annular, thermoplastic seal.
Figure 11C:
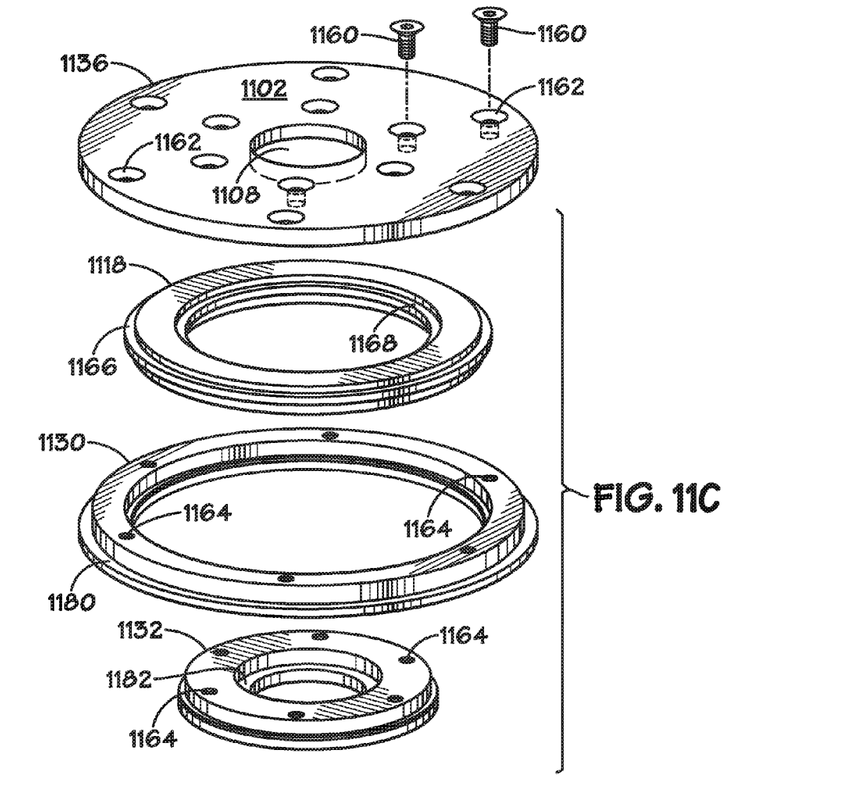
FIG. 11C is an exploded view of the seal plate of FIG. 11A.

Referring now to FIGS. 11A, 11B and 11C, an upper seal plate according to an eighth embodiment of the invention is shown. An upper metal seal plate with a thermoplastic insert is shown in FIG. 11A. The assembled seal plate without the thermoplastic insert is shown in FIG. 11B. An exploded view of upper seal plate 1100 is shown in FIG. 11C.

Seal plate 1100 is similar to seal plate 1000 illustrated in FIG. 10 but does not have the rabbet joint between the metal body portions. Seal plate 1100 comprises metal body portions 1130, 1132 and 1136 which are held together by machine screws 1160 to produce a generally ring-shaped seal plate having upper, generally planar surface 1102, an opposing, lower, generally planar surface 1104 with a central, axial opening 1108 providing a passage from upper surface 1102 to lower surface 1104. Perimeter surface 1116 is generally cylindrical and may have circumferential groove 1106 for retaining a seal which may be an O-ring seal for sealing between the seal plate 1100 and the bore of the mounting plate in which the valve is inserted.

Central axial bore 1108 may have groove 1110 in its inner wall for retaining a seal which may be a T-seal (such as is illustrated in FIGS. 1, 2 and 3) for sealing between upper seal plate 1100 and valve stem 106 (as illustrated in FIGS. 1, 2 and 3).

Body portion 1136 is generally disk-shaped. Countersunk holes 1162 are sized and spaced for receiving screws 1160 and pass from the upper surface of disk 1136 to the underside thereof. Body portions 1130 and 1132 are generally ring-shaped and have a plurality of threaded bores 1064 sized and spaced to receive and engage machine screws 1160.

When assembled (as shown in FIG. 11B) metal body portions 1130, 1132 and 1136 form annular cavity 1122 having a generally T-shaped cross section. In one particular preferred embodiment, metal body portions 1130, 1132 and 1136 are steel and thermoplastic insert 1118 comprises [or is comprised of] Delrin® polyoxymethylene. Metal body portions 1130, 1132 and 1136 may be formed by machining metal blanks or by other methods known in the art. The exposed surface of insert 1118 (at lower surface 1104) may be smoothed and/or polished as necessary by machining and/or grinding as is well-known in the art to make its surface flush with lower surface 1104 of metal body portions 1130, 1132 and 1136.

Metal body portion 1130 may have perimeter shoulder 1180. When assembled (as shown in FIG. 11B) shoulder 1180 and the underside of metal body portion 1136 form groove 1106. Metal body portion 1132 may have interior shoulder 1182. When assembled (as shown in FIG. 11B) shoulder 1182 and the underside of metal body portion 1136 form groove 1110.

Thermoplastic insert 1118 may be machined, molded or formed by other methods known in the art. The outer, perimeter surface of insert 1118 may be provided with shoulder 1166 for retaining seal 1174 which may be an O-ring seal. The inner surface of thermoplastic insert 1118 may comprises shoulder 1168 for retaining seal 1176 which may be an O-ring seal. Seals 1174 and 1176 may provide a fluid-tight seal between thermoplastic insert 1118 and metal body portions 1130, 1132 and 1136.

As shown in phantom in FIG. 11A, annular cavity 1122 is positioned between metal body portions 1130, 1132 and 1136 such that thermoplastic insert 1118 is located within the contact area of the spool seal.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A seal for a pilot-actuated spool valve comprising:
   a metal disk having a generally planar upper surface, a generally planar lower surface, a central axial opening extending from the upper surface to the lower surface and an annular groove in the lower surface having a generally rectangular cross section such that the groove has an inner wall and an outer wall;
   a first groove in the inner wall of the annular groove;
   a second groove in the outer wall of the annular groove;
   a ring-shaped engineering thermoplastic insert within the annular groove having a generally T-shaped cross section with an inner shoulder and an outer shoulder;
   a first keeper in the first groove in the inner wall of the annular groove which bears against the inner shoulder of the thermoplastic insert; and,
   a second keeper in the second groove in the outer wall of the annular groove which bears against the outer shoulder of the thermoplastic insert.

2. The seal for a pilot-actuated spool valve recited in claim 1 wherein the engineering thermoplastic insert is formed of polyoxymethylene.

3. The seal for a pilot-actuated spool valve recited in claim 1 where the first keeper is an outside spring clip.

4. The seal for a pilot-actuated spool valve recited in claim 1 where the second keeper is an inside spring clip.

5. The seal for a pilot-actuated spool valve recited in claim 1 further comprising an annular groove in the engineering thermoplastic insert and a seal within the groove.

6. The seal for a pilot-actuated spool valve recited in claim 5 wherein the seal within the groove is an O-ring seal.

7. A pilot-actuated spool valve comprising:
   (a) a valve body defining a valve chamber and a piston chamber therein, said valve body having a supply opening, a vent opening and a function opening and defining a pilot pressure circuit in communication with said piston chamber;
   (b) a piston being movably disposed within said piston chamber and having a piston stem movably disposed within said piston chamber and having a piston stem movably disposed within said valve chamber;
   (c) first and second seal elements being located in spaced relation within said valve chamber, wherein at least one of said first and second seal elements comprises
- a metal disk having a generally planar upper surface, a generally planar lower surface, a central axial opening extending from the upper surface to the lower surface and an annular groove in the lower surface having a generally rectangular cross section such that the groove has an inner wall and an outer wall;
- a first groove in the inner wall of the annular groove;
- a second groove in the outer wall of the annular groove;
- a ring-shaped engineering thermoplastic insert within the annular groove having a generally T-shaped cross section with an inner shoulder and an outer shoulder;
- a first keeper in the first groove in the inner wall of the annular groove which bears against the inner shoulder of the thermoplastic insert; and,
- a second keeper in the second groove in the outer wall of the annular groove which bears against the outer shoulder of the thermoplastic insert.

8. The pilot-actuated spool valve recited in claim 7 wherein the engineering thermoplastic insert is formed of polyoxymethylene.

9. The pilot-actuated spool valve recited in claim 7 where the first keeper is an outside spring clip.

10. The pilot-actuated spool valve recited in claim 7 where the second keeper is an inside spring clip.

11. The pilot-actuated spool valve recited in claim 7 further comprising an annular groove in the engineering thermoplastic insert and a seal within the groove.

12. The pilot-actuated spool valve recited in claim 11 wherein the seal within the groove is an O-ring seal.

* * * * *